(12) United States Patent
Mudulodu et al.

(10) Patent No.: US 7,535,979 B2
(45) Date of Patent: May 19, 2009

(54) METHOD AND SYSTEM FOR PERFORMING CHANNEL ESTIMATION IN A MULTIPLE ANTENNA BLOCK TRANSMISSION SYSTEM

(75) Inventors: Sriram Mudulodu, Milpitas, CA (US); Krishnamurthy Giridhar, Tamil Nadu (IN)

(73) Assignee: BECEEM Communications Inc., Santa Clara, CA (US)

( * ) Notice: Subject to any disclaimer, the term of this patent is extended or adjusted under 35 U.S.C. 154(b) by 0 days.

(21) Appl. No.: 11/998,102

(22) Filed: Nov. 28, 2007

(65) Prior Publication Data

US 2008/0075210 A1 Mar. 27, 2008

Related U.S. Application Data

(62) Division of application No. 11/195,523, filed on Aug. 1, 2005, now Pat. No. 7,382,842.

(51) Int. Cl.
*H04L 1/02* (2006.01)
*H04B 7/08* (2006.01)

(52) U.S. Cl. ...................... 375/347; 455/132

(58) Field of Classification Search .......... 375/141, 375/147, 148, 140, 130, 267, 299, 316, 347; 455/101, 132, 137; 370/208, 319
See application file for complete search history.

(56) References Cited

U.S. PATENT DOCUMENTS

| | | | | |
|---|---|---|---|---|
| 6,545,997 | B1 * | 4/2003 | Bohnke et al. | 370/347 |
| 7,068,628 | B2 * | 6/2006 | Li et al. | 370/334 |
| 2003/0012267 | A1 * | 1/2003 | Jitsukawa et al. | 375/148 |
| 2004/0052304 | A1 * | 3/2004 | Reial | 375/148 |
| 2005/0094740 | A1 * | 5/2005 | Borran et al. | 375/267 |
| 2005/0111598 | A1 * | 5/2005 | Felter | 375/347 |
| 2005/0135497 | A1 * | 6/2005 | Kim et al. | 375/267 |
| 2007/0253321 | A1 * | 11/2007 | Akita et al. | 370/208 |

OTHER PUBLICATIONS

Wang et al., "Adaptive Channel Estimation Using Pilot-Embedded Data-Bearing System," IEEE, Transaction on signal processing, 2006, vol. 54, pp. 4706-4716.*

Song et al., "Computational Efficient Smart Antennas for CDMA Wireless Communication," IEEE IEEE Transaction on Vehicular Technology, 2001, vol. 50, pp. 1613-1628.*

* cited by examiner

*Primary Examiner*—Tesfaldet Bocure

(57) ABSTRACT

Methods and systems for performing channel estimation in a multiple antenna block transmission system are provided so as to improve the channel estimation quality and/or the delay spread of the channels that can be estimated.

9 Claims, 4 Drawing Sheets

METHOD AND SYSTEM FOR PERFORMING CHANNEL ESTIMATION IN A MULTIPLE ANTENNA BLOCK TRANSMISSION SYSTEM

RELATED APPLICATIONS

This application is a divisional application of patent Ser. No. 11/195,523 filed Aug. 1, 2005, now issued as U.S. Pat. No. 7,382,842.

BACKGROUND

The invention relates to block transmission systems. More specifically, the invention relates to a method and system for performing channel estimation in a multiple antenna block transmission system.

In some known block transmission systems, for example, it is desirable to transmit a preamble from a first transmit antenna for synchronizing and training receivers or subscriber units that are capable of decoding signals from a single transmit antenna. However there may be other subscriber units that can decode signals from multiple transmit antennas. In order to train these remaining transmit antennas to the same extent as the first transmit antenna, considerable overhead is incurred. These remaining transmit antennas may transmit with lower pilot density to avoid these overheads. This, in turn may limit the delay spread of the channels that can be estimated or effect the channel estimation quality for these remaining transmit antennas.

In some block transmission systems, the quality of the pilots of a first transmit antenna may be different from the quality of the pilots of remaining transmit antennas, due to different boosting, different interference (as seen at the receiver) or other factors. This in turn effects the quality of the channel estimation corresponding to the first transmit antenna.

Therefore there is need for a method and system that improves the channel estimation quality and increases the delay spread of the channels that can be estimated in such block transmission systems.

SUMMARY

An objective of the invention is to provide a method and system for performing channel estimation in a multiple antenna block transmission system, in which the delay spread of the channels that can be estimated is increased to that of at least one first transmit antenna (having significantly higher pilot density among a plurality of transmit antennas).

Another objective of the invention is to provide a method and system for channel estimation in a block transmission system, in which the channel responses are estimated based on at least one weighted averaged delay profile so as to improve the channel estimation quality.

In order to fulfill the above-mentioned objectives, a method and system for performing channel estimation for each transmit antenna-receive antenna pair in a block transmission system is provided.

In an embodiment of the invention, the method includes estimating at least one first delay profile for each receive antenna corresponding to at least one first transmit antenna of a transmitter. The pilot density of the at least one first transmit antenna is significantly higher among a plurality of transmit antennas of the transmitter. The method further includes estimating at least one desired delay profile for each receive antenna corresponding to each remaining transmit antenna of the transmitter based on the at least first delay profile. Each remaining transmit antenna has pilot density lesser than the at least one first transmit antenna. The method further includes determining the channel response of each receive antenna corresponding to each remaining transmit antenna based on the corresponding at least one desired delay profile. As a result, the delay spread of the channels corresponding to the remaining transmit antennas that can be estimated is extended to that of the at least one first transmit antenna.

In another embodiment of the invention, the method includes determining a delay profile of each transmit antenna-receive antenna pair and calculating at least one weighted averaged delay profile. The method of obtaining the weighted averaged delay profile comprises performing a spatial weighted averaging of the delay profiles of the plurality of transmit antenna-receive antenna pairs. The method further includes estimating a channel response of each transmit antenna-receive antenna pair based on the at least one weighted averaged power delay profile.

BRIEF DESCRIPTION OF THE DRAWINGS

A more complete appreciation of the invention and the attended advantages will become readily apparent as the same becomes better understood by reference of the following detailed description when considered in conjunction with the accompanying drawings in which reference symbols indicate the same or similar components, wherein.

DETAILED DESCRIPTION OF DRAWINGS

This invention provides a method and system for performing channel estimation for each transmit antenna-receive antenna pair in a block transmission system. Examples of block transmission include Orthogonal Frequency-Division Multiplexing (OFDM), Multi-Carrier Code Division Multiple Access (MC-CDMA), Discrete Multi-Tone (DMT) and the like. The IEEE 802.16d and 802.16e wireless Metropolitan Area Network (MAN) standards, which use Orthogonal Frequency Division Multiple Access (OFDMA) (an OFDM technology with multiple access) also fall in this category.

Figure 1:
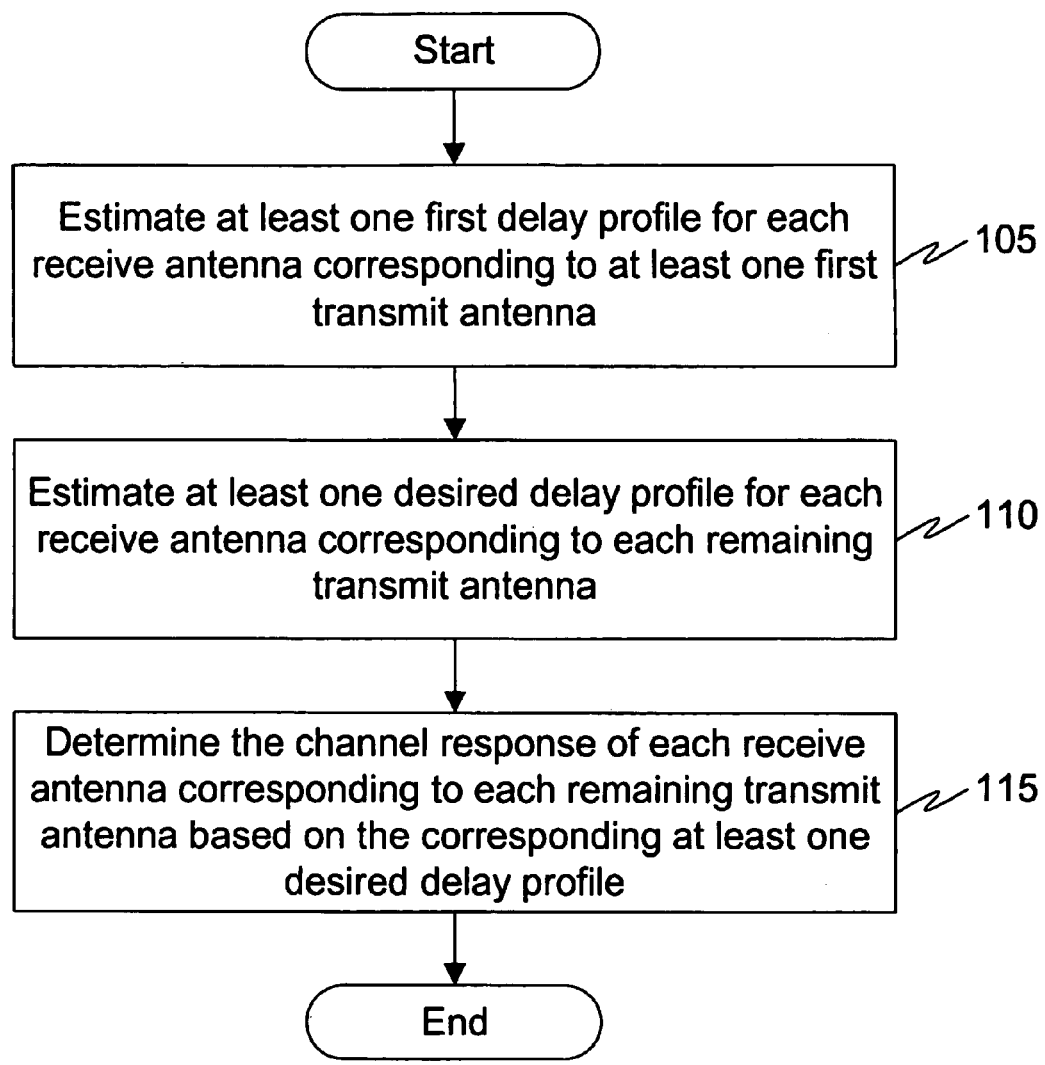
FIG. 1 is a flowchart of a method for performing channel estimation for each transmit antenna-receive antenna pair in a block transmission system, in accordance with an embodiment of the invention.

FIG. 1 is a flowchart of a method for performing channel estimation for each transmit antenna-receive antenna pair in a block transmission system, in accordance with an embodiment of the invention. The block transmission system includes at least one transmitter. In this embodiment of the invention, the transmitter includes a plurality of transmit antennas. At least one first transmit antenna has significantly higher pilot density, or the pilot spacing available for the at least one first transmit antenna is smaller than that available for the remaining transmit antennas. This occurs for example, in 802.16d and 802.16e WMAN OFDMA systems, where each frame comprises a preamble that is transmitted only by a first transmit antenna. The preamble has pilots that are spaced three sub-carriers apart. The pilot density in a symbol for the remaining transmit antennas is much lower. In general, greater the pilot density (or the number of pilots divided by the total number of sub-carriers used), better is the quality of channel estimate.

At step 105, at least one first delay profile of each receive antenna is estimated corresponding to at least one first transmit antenna. A delay profile of a transmit antenna-receive antenna captures information about the delays at which dominant paths or taps in the channel impulse response (CIR) exist. Due to the nature of wireless channels, the CIR is specular in nature. In other words, significant energy in the taps exist only at certain delays and not all delays.

In an embodiment of the invention, the first delay profile is a first power delay profile (PDP). A PDP ($\xi_{m,n}$) of a transmit antenna (m)-receive antenna (n) pair provides information on the tap power versus the tap delay of the CIR of the transmit antenna-receive antenna pair. In an embodiment of the invention, the PDP is obtained as $|h_{m,n}(k,l)|^2$, where, h is channel impulse response;

k is a tap index; and l is a symbol index.

In another embodiment of the invention, it is obtained by also performing a weighted time averaging of $|h_{m,n}(k,l)|^2$ corresponding to a plurality of symbols (l). In one embodiment, these weights are chosen to be equal. In another embodiment, the weights are chosen so that a symbol l is given higher weightage than a symbol l-p, where p is a positive integer.

In another embodiment of the invention, the first delay profile is a first tap delay profile (TDP). A TDP ($\lambda_{m,n}$) of a transmit antenna (m)-receive antenna (n) pair provides the information regarding the position or location of the significant taps in the corresponding CIR. In an embodiment of the invention, the TDP is estimated by obtaining the PDP and then considering those tap locations where the power in the PDP exceeds a threshold. The threshold is a design parameter. In another embodiment, the TDP is obtained from the pilots transmitted by the first transmit antenna by using information theoretic criterion like akaike criterion. One such method is described in a publication by J J Van de Beek et al. entitled, "On channel estimation in OFDM systems" in Proc. of IEEE VTC, 1995, vol. 2, pp. 815-819, July 1995.

In yet another embodiment of the invention, the first delay profile is a first CIR auto-correlation matrix. An element, (i,j) of the auto-correlation matrix of a CIR is given by h(j)h(j)* (where the superscript * denotes complex conjugate). The auto-correlation matrix may be time weighted averaged across a plurality of symbols in time.

At step 110, at least one desired delay profile is estimated for each receive antenna corresponding to each remaining transmit antenna of the transmitter based on the at least one first delay profile. Each remaining transmit antenna has a pilot density lesser than the at least one first transmit antenna.

In an embodiment of the invention, the desired delay profile is a desired PDP ($\xi^d$). In one embodiment, the desired PDP of a receive antenna (n1), corresponding to each remaining transmit antenna (m) may be chosen to be a weighted combination of the first PDPs of the plurality of receive antennas, ($\xi_{m1,n}$) (where m1 denotes at least one first transmit antenna having significantly higher pilot density). In another embodiment, the desired PDP ($\xi^d_{m,n1}$) of a receive antenna (n1) corresponding to each remaining transmit antenna (m) may be chosen to be a weighted combination of the first PDPs ($\xi_{m1,n1}$) corresponding to the receive antenna (n1). This may be useful, in some cases when the plurality of receive antennas form a diversity array and the channel is slow fading.

In an embodiment of the invention, the desired delay profile is a desired TDP. In an embodiment of the invention, the desired TDP, ($\lambda^d_{m,n1}$) of a receive antenna (n1) corresponding to each remaining transmit antenna (m) is chosen as the first TDP of the receive antenna corresponding to a first transmit antenna, ($\lambda_{1,n1}$), if the first transmit antenna has significantly higher pilot density compared to the remaining transmit antennas.

In another embodiment of the invention, if a first transmit antenna has significantly pilot density compared to the remaining transmit antennas, the desired TDP of a receive antenna (n1) corresponding to each remaining transmit antenna (m) is based on the first TDPs, ($\lambda_{1,n}$) of the plurality of receive antennas. For example, it may be chosen as the union across the receive antennas of these first TDPs, ($\lambda_{1,n}$). This may be useful if the receive antennas form a diversity array and the channel is fast fading. This may further be useful if the TDP has not been derived from the multiple CIRs in time, for example, due to storage or other limitations on the receiver.

In some embodiments, the set of p taps on either sides of each tap in the desired TDP is also included, prior to obtaining the channel estimates. This is henceforth referred to as smearing. This may help for example in some cases when the dominant paths are not well separated. In these cases, due to the presence of filters in the block transmission system, the resultant CIR may not show significant energy at some of the neighboring tap locations for a particular realization of the gains of these dominant taps. However with a different fading realization, these tap locations also contain significant energy. If the desired TDP is derived from one or few realizations, it may then be smeared to cover the cases for other realizations.

In yet another embodiment of the invention, the desired delay profile is a desired CIR auto-correlation matrix.

At 115, channel response of each receive antenna corresponding to each remaining transmit antennas is estimated based on the corresponding desired delay profile. For example, if the desired delay profile is a desired TDP, the modified Least Square (mLS) method can be used to estimate the channel response for a transmit antenna-receive antenna pair, based on the pilots available for the corresponding transmit antenna. One such mLS method is described in (and the references therein) by M R Raghavendra and K Giridhar entitled, "Improving channel estimation in OFDM systems for sparse multipath channels", IEEE Signal Proc. Letters, vol. 12, no. 1, pp. 52-55, January 2005.

In various embodiments of the invention, as a result, the delay spread of channels corresponding to the remaining transmit antennas that can be estimated at the receiver is extended to that of the first transmit antenna. This method helps in performing channel estimation at the receiver for a remaining transmit antenna, which otherwise may not be estimated due to limited pilot spacing of the remaining transmit antenna. For example, if the pilot spacing available for the first transmit antenna is three and the remaining transmit antennas is nine, then the delay spread of the channels corresponding to the first transmit antenna that can be estimated is extended from N/9 to N/3 OFDM samples, where N is the total number of sub-carriers. For example, N is the Fast Fourier Transform (FFT) size in an OFDM system.

Figure 2:
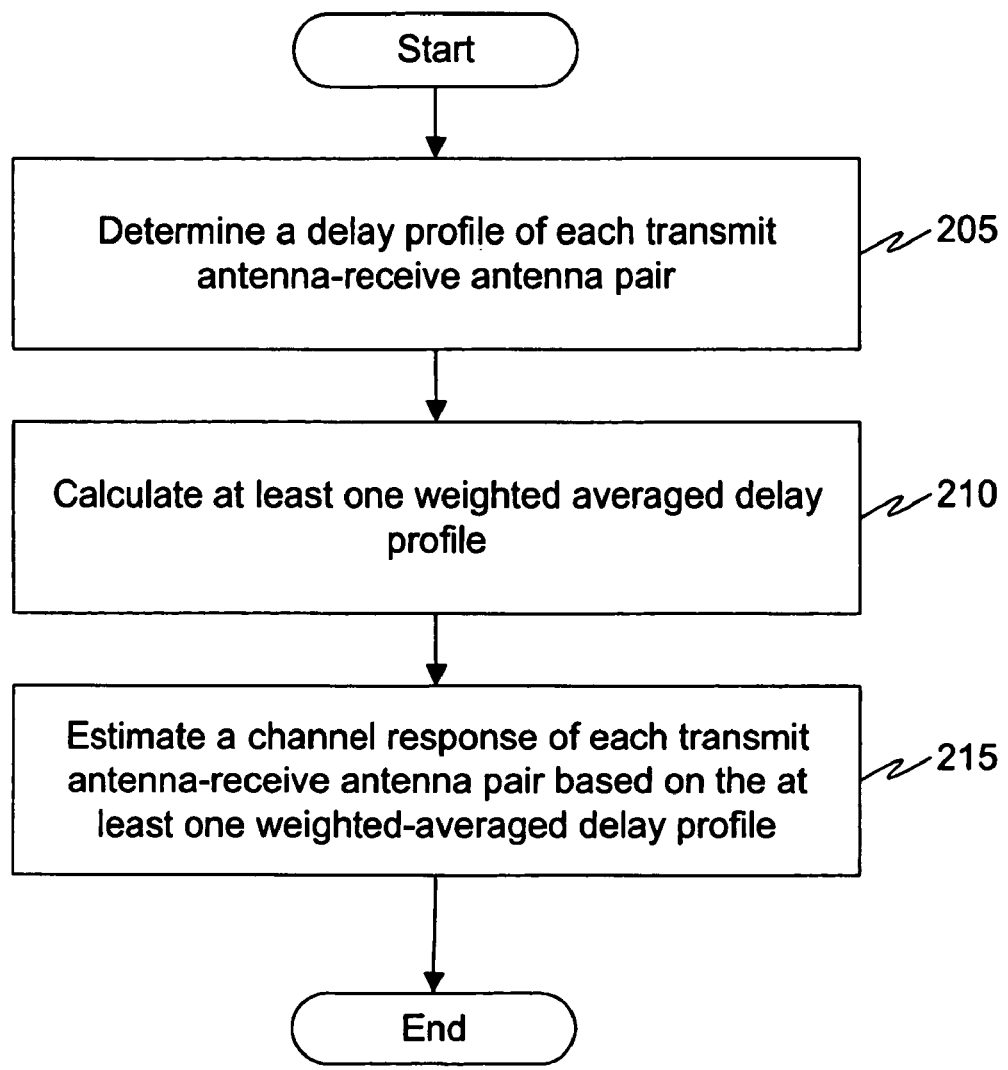
FIG. 2 is a flowchart of a method for performing channel estimation for each transmit antenna-receive antenna pair in a block transmission system, in accordance with another embodiment of the invention.

FIG. 2 is a flowchart of a method for performing channel estimation for each transmit antenna-receive antenna pair in a block transmission system, in accordance with another embodiment of the invention. At step 205, a delay profile is determined for each transmit antenna-receive antenna pair. In an embodiment of the invention, the delay profile is a PDP. In another embodiment of the invention, the delay profile is a CIR auto-correlation matrix.

At 210, at least one weighted averaged delay profile is calculated. The at least one weighted averaged delay profile is calculated by performing a spatial weighted averaging of the delay profiles of a plurality of transmit antenna-receive antenna pairs. In an embodiment of the invention, spatial weighting corresponding to a transmit antenna-receive antenna pair is determined based on the pilot density of the corresponding transmit antenna. The spatial weighting corresponding to a transmit antenna-receive antenna pair may also be determined based on the pilot boosting of the corresponding transmit antenna. The spatial weighting corresponding to a transmit antenna-receive antenna may also be determined based on the interferences (as seen at the receiver) on the pilot locations of the signal transmitted by the corresponding transmit antenna.

In an embodiment of the invention, a weighted averaged delay profile is calculated corresponding to each transmit antenna-receive antenna pair. Further, the spatial weights corresponding to a transmit antenna-receive antenna pair may also be a function of the tap locations. This may be useful in slow fading channels and when the antennas form a diversity array. For example, in some cases, if the PDP corresponding to a first transmit antenna-receive antenna pair shows no power at a given tap location, while the PDP corresponding to a second transmit antenna-receive antenna pair shows significant power at the same tap location, the weightage corresponding to the second transmit antenna-receive antenna pair can be set to zero for this tap location, while obtaining the weighted averaged delay profile for the first transmit antenna-receive antenna pair. Also, for determining the weighted averaged delay profile for the second transmit antenna-receive antenna pair, the weightage corresponding to the first pair, for this tap location, can be set to zero.

In another embodiment of the invention, one weighted averaged delay profile is calculated corresponding to the plurality of transmit antenna-receive antenna pairs.

In an embodiment of the invention, when the delay profile is a PDP, the PDP computations and weighted averaging is performed on those tap locations where the power exceeds a predetermined power threshold. The predetermined power threshold is a design parameter. This helps reduce computational power.

At step 215, a channel response of each transmit antenna-receive antenna pair is estimated based on at least one weighted averaged delay profile. In an embodiment of the invention, a CIR of each transmit antenna-receive antenna pair is estimated based on at least one weighted averaged delay profile and thereafter, a channel frequency response (CFR) of each transmit antenna-receive antenna pair is estimated based on the corresponding CIR. For example, the CIR of a transmit antenna-receive antenna pair is estimated from the pilots transmitted from the corresponding transmit antenna using the weighted averaged delay profile computed for that pair. In another example, the CIR of a transmit antenna-receive antenna pair is estimated from the pilots transmitted from the corresponding transmit antenna using the weighted averaged delay profile that is calculated for the plurality of transmit antenna-receive antenna pairs.

In an embodiment of the invention, the TDPs corresponding to the plurality of transmit antenna-receive antenna pairs is spatially combined to obtain a desired TDP for a transmit antenna-receive antenna pair. For example, the desired TDP may be the union of the TDPs of the plurality of the transmit antenna-receive antenna pairs. The CFR corresponding to the transmit antenna-receive antenna pair may be then obtained from the pilots of the corresponding transmit antenna, using the desired TDP. In various embodiments of the invention, the desired TDP may further be smeared prior to CFR estimation.

Figure 3:
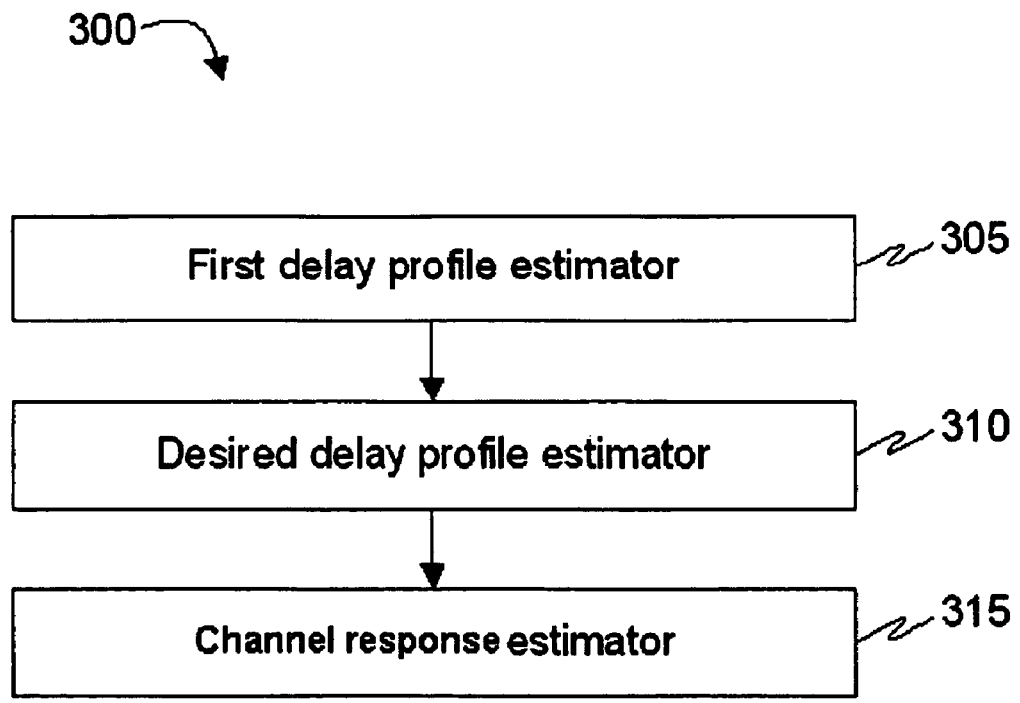
FIG. 3 is a block diagram of a system for performing channel estimation for each transmit antenna-receive antenna pair in a block transmission system, in accordance with an embodiment of the invention.

FIG. 3 is a block diagram of a system 300 for performing channel estimation for each transmit antenna-receive antenna pair in a block transmission system, in accordance with an embodiment of the invention. System 300 includes a first delay profile estimator 305, a desired delay profile estimator 310, and a channel response estimator 315.

First delay profile estimator 305 estimates at least one first delay profile of each receive antenna corresponding to at least one first transmit antenna of a transmitter. The at least one first transmit antenna has significantly higher pilot density or the pilot spacing available for the at least one first transmit antenna is smaller than that available for the remaining transmit antennas. In an embodiment of the invention, the first delay profile is a first TDP. In another embodiment of the invention, the first delay profile is a first PDP. In yet another embodiment of the invention, the first delay profile is a first CIR auto-correlation matrix.

Desired delay profile estimator 310 estimates at least one desired delay profile for each receive antenna corresponding to each remaining transmit antenna of the transmitter, based on the at least first delay profile. Each remaining transmit antenna has a pilot density lesser than the first transmit antenna. In an embodiment of the invention, the desired delay profile is a desired TDP. In another embodiment of the invention, the desired delay profile is a desired PDP. In yet another embodiment of the invention, the desired delay profile is a desired CIR auto-correlation matrix.

Channel response estimator 315 estimates the channel response of each receive antenna corresponding to each remaining transmit antenna based on the corresponding at least one desired delay profile. As a result, the delay spread of channels corresponding to the remaining transmit antennas that can be estimated is extended to that of the first transmit antenna.

In various embodiments of the invention, first delay profile estimator 305, desired delay profile estimator 310 and channel response estimator 315 reside on a receiver. In an embodiment of the invention, these modules may interact with one another. In an embodiment of the invention, first delay profile estimator 305, desired delay profile estimator 310 and channel response estimator 315 can be integrated into a single module.

Figure 4:
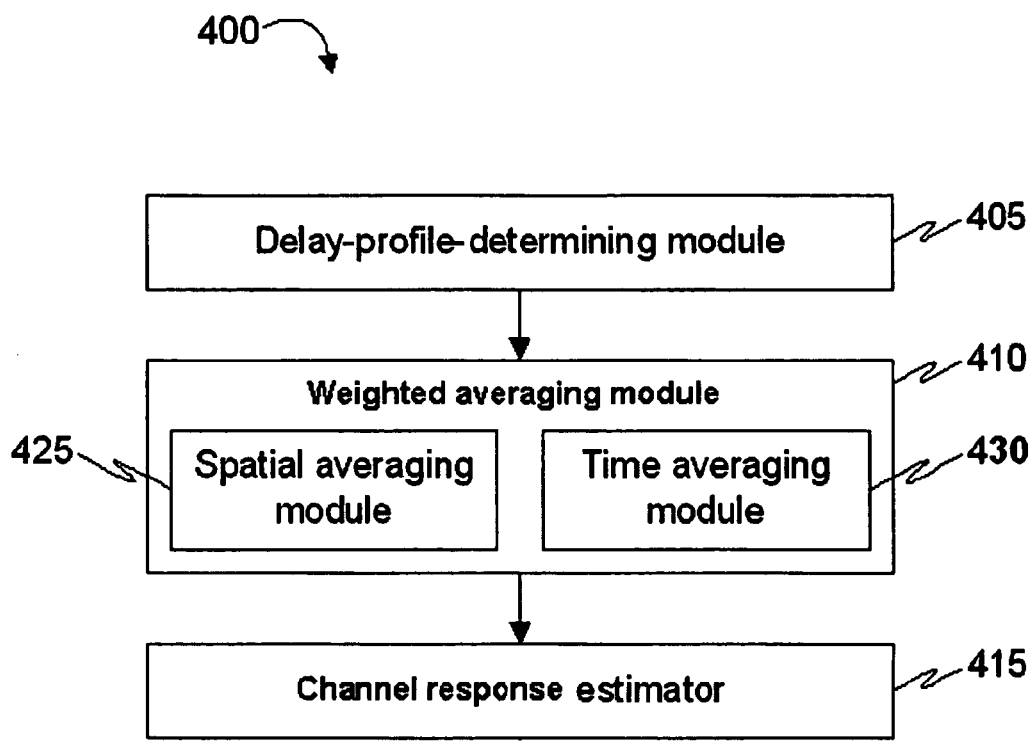
FIG. 4 is a block diagram of a system for performing channel estimation for each transmit antenna-receive antenna pair in a block transmission system, in accordance with another embodiment of the invention.

FIG. 4 is a block diagram of a system 400 for performing channel estimation for each transmit antenna-receive antenna pair in a block transmission system, in accordance with another embodiment of the invention. System 400 includes a delay-profile-determining module 405, a weighted averaging module 410 and a channel response estimator 415.

Delay-profile-determining module 405 determines a delay profile for each transmit antenna-receive antenna pair. In an embodiment of the invention, the delay profile is a PDP. In another embodiment of the invention, the delay profile is a CIR auto-correlation matrix. Weighted averaging module 410 calculates at least one weighted averaged delay profile. In an embodiment of the invention, weighted averaging module 410 includes a spatial averaging module 425. In another embodiment of the invention, weighted averaging module 410 includes spatial averaging module 425 and a time averaging module 430.

Spatial averaging module 425 performs a spatial weighted averaging of the delay profiles of the plurality of transmit antenna-receive antenna pairs. In an embodiment of the invention, spatial weighting corresponding to a transmit antenna-receive antenna pair is determined based on the pilot density of the corresponding transmit antenna. The spatial weighting corresponding to a transmit antenna-receive antenna pair may also be determined based on the pilot boosting of the corresponding transmit antenna. The spatial weighting corresponding to a transmit antenna-receive antenna may also be determined based on the interferences (as seen at the receiver) on the pilot locations of the signal transmitted by the corresponding transmit antenna. In an embodiment of the invention, spatial weights corresponding to a transmit antenna-receive antenna pair is also a function of the tap locations.

Time averaging module 430 performs weighted averaging across a plurality of symbols in time.

In an embodiment of the invention, weighted averaging module 410 calculates a weighted averaged delay profile corresponding to each transmit antenna-receive antenna pair. In another embodiment of the invention, weighted averaging module 410 calculates a weighted averaged delay profile corresponding to a plurality of transmit antenna-receive antenna pairs.

Channel response estimator 415 estimates a channel response of each transmit antenna-receive antenna pair based on at least one weighted averaged delay profile.

In various embodiments of the invention, delay-profile-determining module 405, weighted averaging module 410 and channel response estimator 415 reside on a receiver. In an embodiment of the invention, these modules may interact with one another. In an embodiment of the invention, delay-profile-determining module 405, weighted averaging module 410 and channel response estimator 415 can be integrated into a single module.

The various embodiments of the invention provide a method and system whereby, if a first transmit antenna has significantly higher pilot density compared to the remaining transmit antennas, the delay spread of the channels corresponding to the remaining transmit antennas that can be estimated, is extended to that of the first transmit antenna. This may help in estimating channel responses with large delay spread which other wise may not be estimated.

The various embodiments of the invention provide a method and system for channel estimation in a block transmission system in which the channel responses are estimated based on at least one weighted averaged delay profile. The weighted averaged delay profile is calculated by performing at least one of a spatial weighted average and a time domain weighted average. As a result, the quality of channel estimates of lesser trained transmit antennas improves. Also if all the transmit antennas are equally trained, the quality of the channel estimates of each of them improves as a result.

What is claimed is:

1. A method for performing channel estimation for each transmit antenna-receive antenna pair in a block transmission system, the method comprising the steps of:
   a. estimating at least one first delay profile for each receive antenna corresponding to at least one first transmit antenna of a transmitter, the pilot density of the at least one first transmit antenna being significantly higher among a plurality of transmit antennas of the transmitter;
   b. estimating at least one desired delay profile for each receive antenna corresponding to each remaining transmit antenna of the transmitter based on the at least first delay profile, each remaining transmit antenna having pilot density lesser than the at least one first transmit antenna; and
   c. estimating the channel response of each receive antenna corresponding to each remaining transmit antenna based on the corresponding desired delay profile; whereby, the delay spread of the channels corresponding to the remaining transmit antennas that can be estimated is extended to that of the at least one first transmit antenna.

2. The method of claim 1, wherein the at least one first delay profile comprises a first tap delay profile.

3. The method of claim 1, wherein the at least one first delay profile comprises a first power delay profile.

4. The method of claim 1, wherein the at least one first delay profile comprises a first channel impulse response (CIR) auto-correlation matrix.

5. The method of claim 1, wherein the at least one desired delay profile comprises a desired tap delay profile.

6. The method of claim 1, wherein the at least one desired delay profile comprises a desired power delay profile.

7. The method of claim 1, wherein the at least one desired delay profile comprises a desired channel impulse response (CIR) auto-correlation matrix.

8. A system for performing channel estimation for each transmit antenna-receive antenna pair in a block transmission system, the system comprising:
   a. a first delay profile estimator, the first delay profile estimator estimating at least one first delay profile for each receive antenna corresponding to at least one first transmit antenna of a transmitter, the pilot density of the at least one first transmit antenna being highest among a plurality of transmit antennas of the transmitter;
   b. a desired delay profile estimator, the desired delay profile estimator estimating at least one desired delay profile for each receive antenna corresponding to each remaining transmit antenna of the transmitter based on the at least first delay profile, each remaining transmit antenna having pilot density lesser than the at least one first transmit antenna; and
   c. a channel response estimator, the channel response estimator estimating the channel response of each receive antenna corresponding to each remaining transmit antenna based on the corresponding at least one desired delay profile;
   whereby, the delay spread of the channels corresponding to the remaining transmit antennas that can be estimated is extended to that of the at least one first transmit antenna.

9. The system of claim 8, wherein the first delay profile estimator, the desired delay profile estimator and the channel response estimator can be integrated into a single module.

* * * * *